United States Patent
Wagoner

Patent Number: 5,642,942
Date of Patent: Jul. 1, 1997

[54] THRUST PLUGS FOR ROTARY CONE AIR BITS

[75] Inventor: Robert Wagoner, Ponca City, Okla.

[73] Assignee: Smith International, Inc., Houston, Tex.

[21] Appl. No.: 622,646

[22] Filed: Mar. 26, 1996

[51] Int. Cl.[6] .................................. F16C 33/00
[52] U.S. Cl. .................. 384/95; 175/371; 384/92; 384/425
[58] Field of Search .................. 384/92, 95, 420, 384/425; 175/371, 372

[56] References Cited

U.S. PATENT DOCUMENTS

| | | | |
|---|---|---|---|
| 3,480,341 | 11/1969 | Hickernell | 384/95 |
| 3,720,274 | 3/1973 | McCallum | 175/372 |
| 4,098,358 | 7/1978 | Klima | 175/371 X |
| 4,270,812 | 6/1981 | Thomas | 384/95 |
| 4,416,554 | 11/1983 | Pribbenow | 384/95 |
| 4,421,184 | 12/1983 | Mullins | 175/371 |
| 4,428,442 | 1/1984 | Steinke | 175/228 |
| 4,549,820 | 10/1985 | Mullins | 384/95 |
| 5,148,879 | 9/1992 | Hooper | 175/371 |

*Primary Examiner*—Thomas R. Hannon
*Attorney, Agent, or Firm*—Robert M. Vargo; Robert G. Upton

[57] ABSTRACT

A radially disposed thrust bearing assembly for air cooled and lubricated mining type rotary cone rock bits consists of a first non-rotating radially disposed steel thrust bearing disc and an apposed, non-rotating carbide thrust bearing disc. One of the thrust bearing discs is pressed into a disc retention socket formed in the end of a spindle bearing extending from the end of a main axially aligned bearing cantilevered from a leg of the bit and the other thrust bearing disc is pressed into a disc retention socket formed in the rotary cone. An edge of the carbide disc is formed with large valleys and peaks, the robust undulations resist cracking when the carbide thrust bearing disc is pressed into its respective socket. Unique air passages and channels are formed in the main and spindle bearings to direct cooling air to the apposed thrust bearing discs.

18 Claims, 4 Drawing Sheets

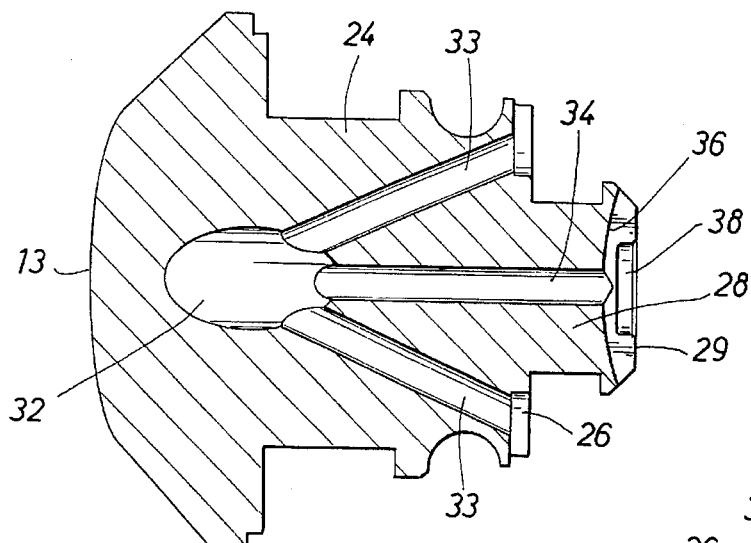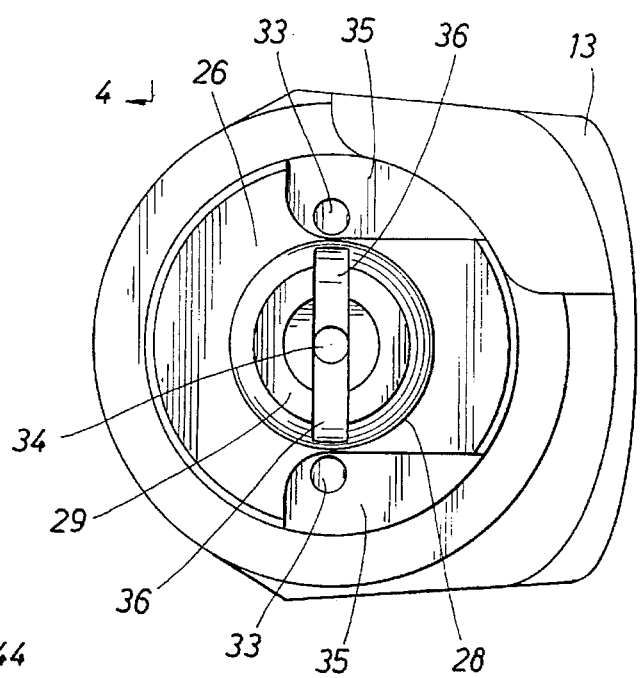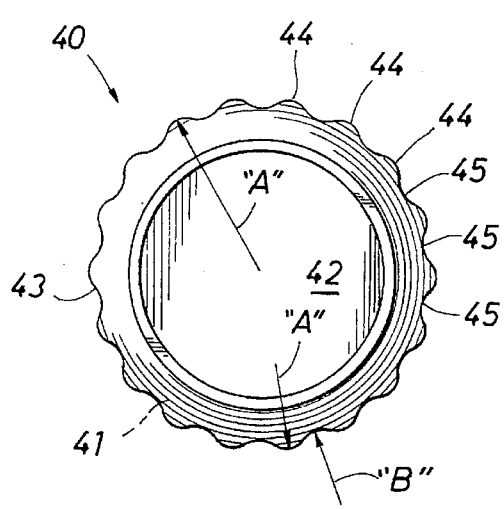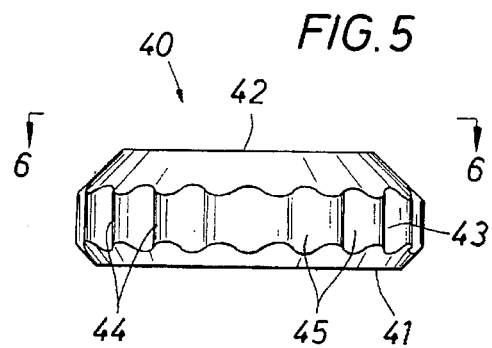

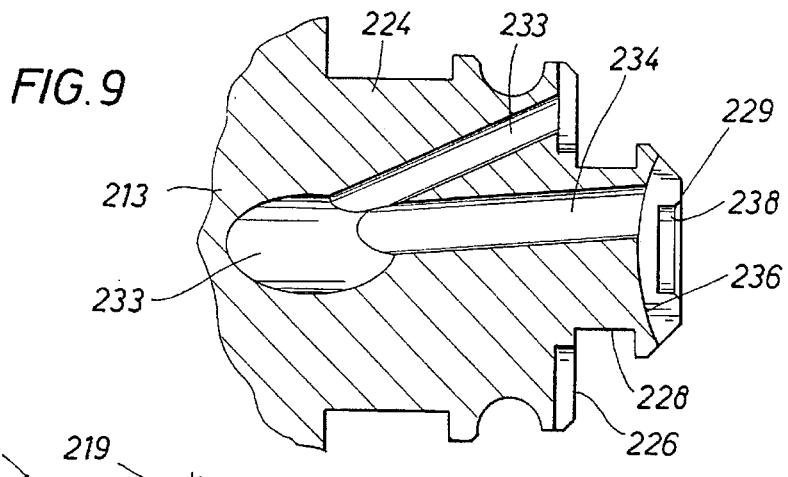
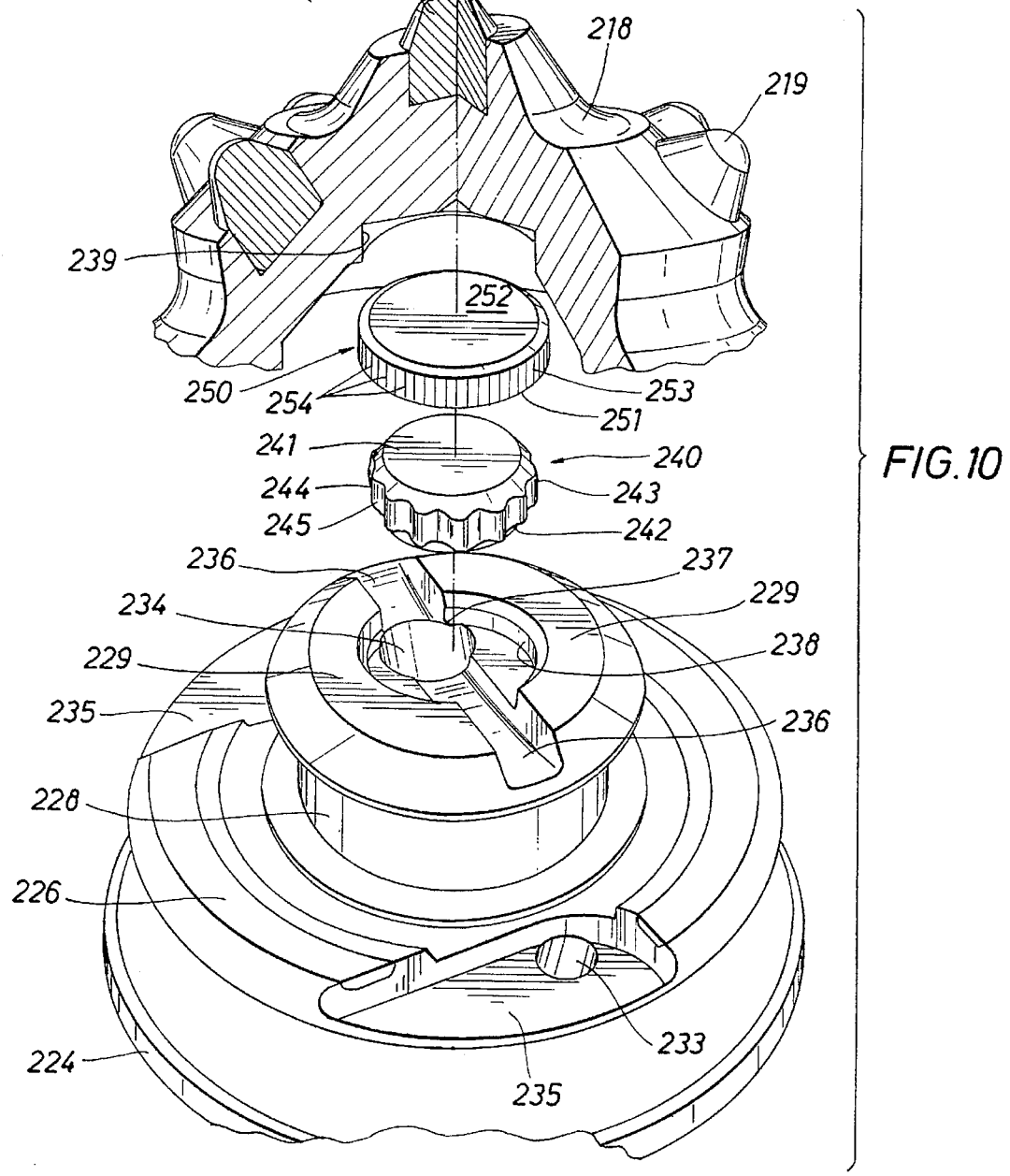

THRUST PLUGS FOR ROTARY CONE AIR BITS

BACKGROUND OF THE INVENTION

1. Field of the Invention

This invention relates to thrust bearings for rotary cone rock bits that utilize fluid such as air to cool and clean the bit as it works in a borehole.

More specifically, this invention relates to an intermediate thrust bearings radially disposed between a roller cone and a journal and a means to secure and cool the thrust bearings therebetween. The thrust bearing is primarily designed to take axial out thrusting loads on the cones and journals.

2. Background

There are a number of prior art patents that provide some means between rotating cones and their respective journals to take axially directed out thrust loads against radial journal bearing surfaces.

It is within the state of the art to provide a hard metal bearing surface on radially disposed areas of the journal and the cone by either depositing hard metal material to the end of the journal or within radially disposed bearing surfaces in the cone. The deposited hard metal material is subsequently machined to provide a smooth bearing surface between the journal and the rotary cone.

The problems that emerge utilizing the foregoing techniques are many. For example, when hard metal material is metalurgically deposited within the cone or on the radially disposed bearing surfaces of the journal, the heat generated causes stress risers that can result in cracks, especially in rotating cones. In addition, it is difficult, costly and time-consuming to machine these rough, hard metal depositions surfaces to form good bearing surfaces essential to the proper operation and longevity of the rock bit.

The present invention overcomes this difficulty by providing one or more hard metal, non-rotating thrust bearing inserts, interference fitted within either the cone or the end of the journal bearing or both.

U.S. Pat. No. 3,720,274 teaches the use of an intermediate thrust bearing washer freely disposed between radially aligned bearing surfaces formed between the end of the journal bearing pin and a rotating cutter cone associated therewith. The thrust bearing serves to support thrust loads and to stabilize the cutter cones. The thrust washer is allowed to float between the radially disposed bearing surfaces during operation of the bit in a borehole. A difficulty with this arrangement is that, as the rock bit wears in an operating mode, the thrust washer begins to gall causing the bearings to eventually fail.

U.S. Pat. No. 4,270,812 is assigned to the same assignee as the present invention and incorporated hereby by reference. This patent teaches forming a spindle bearing surface extending from a journal bearing of a rotary cone rock bit with a diameter less than that of the mating bearing formed by the cutter cone. A cylindrical tubular sleeve of hard low friction metal has an inner diameter greater than the diameter of the spindle bearing. The sleeve is inserted over the spindle bearing and a disc is placed over the end and inside the tubular sleeve. Solder is flowed between the sleeve and the disc to attach the sleeve and disc to the bearing spindle to create a hard-faced bearing spindle on the end of the journal.

While the sleeved spindle is an improvement over the metallurgical application of hardfacing material to the thrust bearing surfaces, edge loading and high frictional loads is a result due to slight misalignments of the cone with the spindle.

U.S. Pat. No. 5,148,879 also assigned to the same assignee as the present invention and incorporated herein by reference, describes and teaches the use of a spindle cap disposed between a spindle pilot beating extending from the end of a main journal bearing and a cone rotatively secured thereto. The floating spindle cap is formed from a softer metallic material than both the spindle bearing and the cone to accommodate for slight misalignments and edge loading between the journal bearings and the cone while working in a borehole.

While the malleable floating spindle cap performs satisfactorily, it is subject to fairly high wear rates resulting in a somewhat shorter bit life.

The present invention utilizes a pressed in, hard metal carbide thrust button that may be employed in the end of the pilot spindle bearing or in the cone. An oppositely apposed softer metal such as a steel disc is used as a bearing surface for the adjacent bearing surface formed by the carbide thrust button. An air fluid passage is formed adjacent to the base of the carbide button or the steel disc to cool the bearing surfaces formed between the steel disc and the carbide thrust button during operation of the bit in a borehole.

SUMMARY OF THE INVENTION

It is therefore an object of this invention to provide a non-rotating, hard metal, thrust button between the spindle pilot bearing and an apposing, softer metal disc thrust beating and a means to cool the hard metal thrust button and the bearings formed between the thrust button and the softer metal apposing disc.

More specifically, it is an object of this invention to provide a hardmetal carbide thrust button with large peaks and valleys around the knurled perimeter of the carbide thrust button. The large peaks and valleys formed around the edge of the disc like thrust button resists cracking when the button is interference fitted or pressed into a socket formed either in the end of the spindle or in the cone bore. The carbide disc does not crack because of the enlarged robust contact points or "peaks" formed around the periphery of the disc. An air fluid passage intersects the base of the carbide thrust button to cool the non-rotating hard metal button during operation of the bit in a borehole.

An advantage then of the present invention over the prior art is the use of a carbide thrust bearing with large peaks and valleys around the knurled perimeter of the thrust bearing. The relatively large undulations around the edge of the relatively brittle carbide thrust button prevent the carbide from cracking when it is interference fitted or pressed into its socket formed in either the end of the pilot bearing pin or in the rotary cone.

Another advantage of the present invention over the prior art is the means in which the thrust bearings are cooled. An air groove is provided in the bearing support structure to provide a flow of air across a portion of the base of the non-rotating thrust buttons to cool the bearings as they work in a borehole.

BRIEF DESCRIPTION OF THE DRAWINGS

FIG. 3 is a view taken through 3—3 of FIG. 2 illustrating the air fluid passages formed in the leg and journal bearing.

FIG. 4 is an end view taken through 4—4 of FIG. 3.

FIG. 5 is a side view of a carbide thrust bearing illustrating relatively large hill and valley undulations formed around the peripheral edge of the thrust button.

FIG. 6 is a view taken through 6—6 of FIG. 5.

FIG. 9 is a cross-section of a journal bearing with alternative, different diameter air passage grooves formed therein.

FIG. 10 is a partially broken away exploded perspective view of a journal bearing and rotary cone illustrating an alternative embodiment of the invention.

DESCRIPTION OF THE PREFERRED EMBODIMENTS AND BEST MODE FOR CARRYING OUT THE INVENTION

Figure 1:
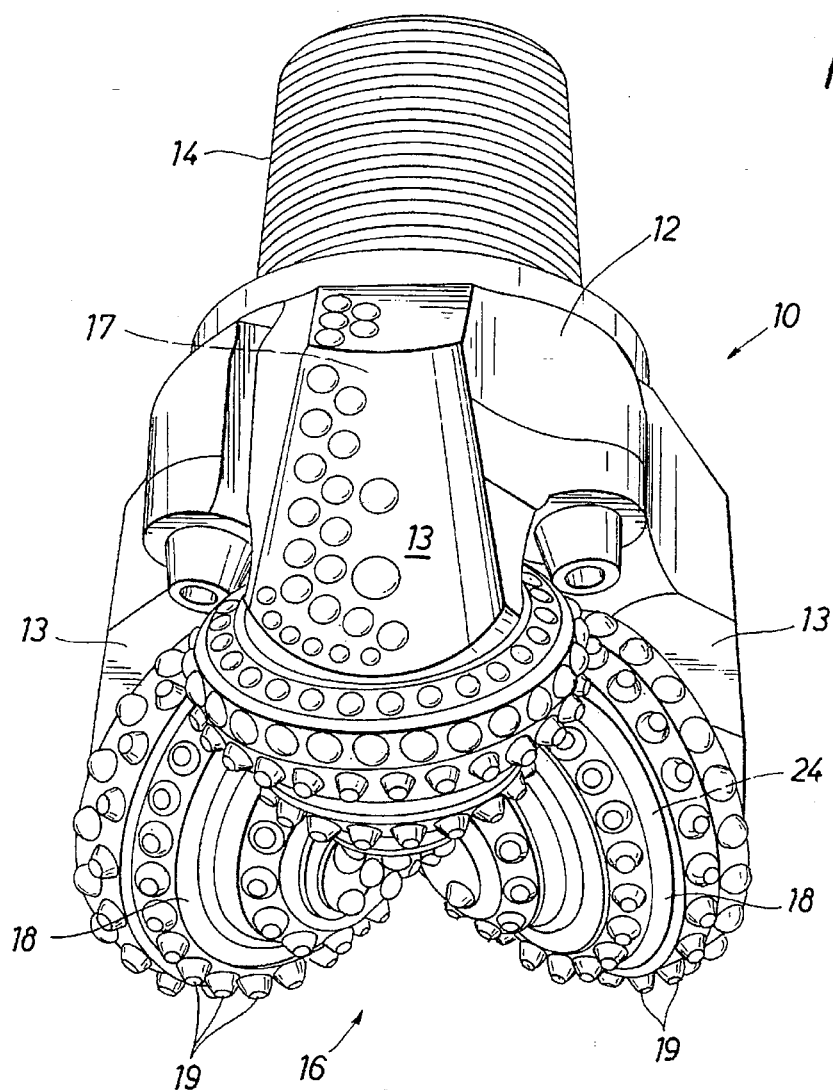
FIG. 1 is a perspective view of a typical rotary cone mining rock bit that is cooled and lubricated by air.

FIG. 1 illustrates a typical mining, roller bearing, air cooled rotary cone rock bit generally designated as 10. The bit 10 consists of bit body 12, threaded pin end 14 and a cutting end generally designated as 16. Each leg 13 supports a rotary cone 18 that is rotatively retained on a journal bearing 24 cantilevered from each of the legs 13. Each of the cones 18, for example, support a multiplicity of tungsten carbide inserts 19 extending from the surface of the cones. The rock bit 10 further forms a fluid or air passage through pin end 14 that communicates with a plenum chamber 17 formed by the bit body 12 (not shown). Typically, one or more air nozzles 15 are secured within the bit body 12. The nozzles 15 direct air from the plenum chamber 17 toward a borehole bottom. Other air passages formed in each leg direct air through passages formed in each journal bearing 24 to cool and clean the bearing retained between the journal and the rotary cones retained thereon.

Figure 2:
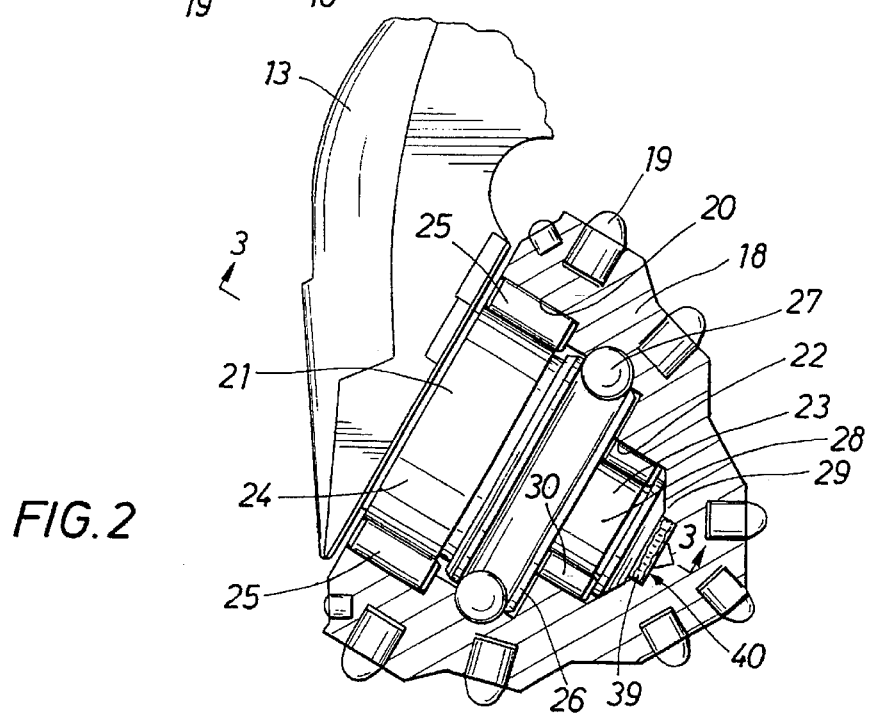
FIG. 2 is a partial cross-section of a rock bit leg, bearing and rotary cone.

With reference now to FIG. 2, journal bearing 24 extending from the leg 13, forms bearing races 21 and 23 for roller bearings 25 and 30. A plurality of ball beatings 27 rotatively retain the cone 18 on the journal bearing 24. Bearing 24 forms a radially disposed snoochie bearing 26 from which a spindle bearing 28 extends. The radial end face 29 of the spindle extends into the cone cavity adjacent cone beating race 22.

A carbide thrust bearing disc, generally designated as 40, is pressed into a bearing cone cavity or socket 39 formed in cone 18.

FIGS. 3 and 4 depict the journal bearing 24 with a main air fluid passage 32 formed in leg 13. The air passage communicates with the plenum 17 formed in the bit body 12 which in turn is open to pin end 14 (not shown). Journal air passages 33 direct air form main passage 32 to the snoochie face 26. An axially aligned air passage 34 directs air to cross channel 36 that is formed in the radial end face 29 of the spindle 28. Cross channel 36 intersects and passes beneath, in this embodiment, a hardened steel bearing thrust plug or disc generally designated as 50 that is interference fitted or pressed into socket 38 formed in spindle 28 (see FIG. 7). The cross channel 36 is more clearly seen with reference to FIG. 4.

Air is dispersed from central passage 34 into channel 36 intersecting base 52 of the hardened steel thrust disc bearing 50 cooling the steel disc and adjacent carbide thrust plug generally designated as 40. The carbide thrust disc is secured by pressing the disc within socket 39 formed in cone 18 (see FIGS. 2 & 7).

Referring now to FIGS. 5 and 6, the preferred carbide thrust disc bearing generally designated as 40 consists of tungsten carbide, grade 510 and is manufactured by Rogers Tool Works, Rogers, Ark.

For example, a tungsten carbide thrust bearing disc designed for a 7⅞ inch rotary cone air bit would be between 0.698 and 0.702 inches in diameter and between 0.228 and 0.232 inches thick.. The outer peripheral edge of the carbide disc 40 consists of a series of relatively large undulations of axially aligned peaks 44 and valleys 45, the peaks being 20 degrees apart. The radius "A" of the peaks 44 is 0.350 inch and the radius "B" of the valleys 45 is 0.330 inch. The tangent curves "C" and "D" interconnecting the peaks and valleys has a radius of 0.047 inch.

As mentioned before sharp, tightly defined knurling around the periphery of state of the art hard material thrust bearing discs such as carbide will easily crack when pressed, through an interference fit, into a socket thrust plug receptacle. The large peaks and valleys of the disc 40 allows for secure retention of the disc in its retention socket 38 or 39 without danger of cracking. Moreover, the large spacing between peaks 44 allows cooling air to penetrate the edge of the disc to help cool the thrust bearing while the bit 10 works in a borehole.

Figure 7:
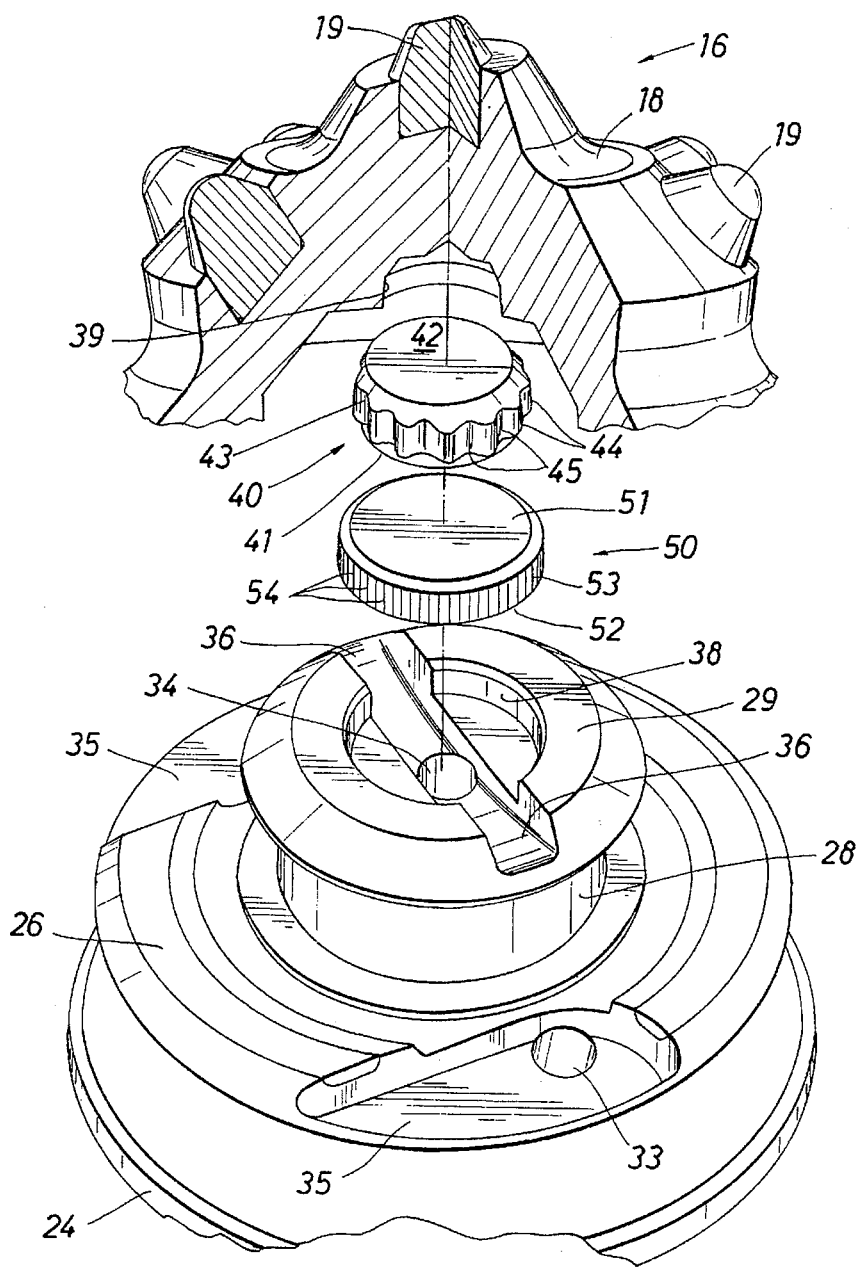
FIG. 7 is a partially broken away exploded perspective view of a journal bearing and rotary cone with a pair of thrust bearings disposed therebetween.

The exploded perspective view of FIG. 7 illustrates the relationship of the hardened steel thrust bearing 50 having normal retention grooves 54 cut into peripheral edge 53. The base of the plug 52 is positioned adjacent channel 36 formed in end 29 of spindle 28 when the steel thrust bearing 50 is pressed into socket 38 formed in the spindle 28. Air is directed into channel 36 through passage 34 and cools the disc 50 along its base 52 as well as the rest of the bearing surfaces 51 and 41 (carbide disc 40). The tungsten carbide disc 40 is pressed into socket 39 formed in cone 18.

The apposing, radially disposed thrust bearing surfaces 41 and 51 undergo heavy out thrusting loads under bit operating conditions and benefit greatly from the superior and novel air cooling ducting system of the present invention.

Figure 8:
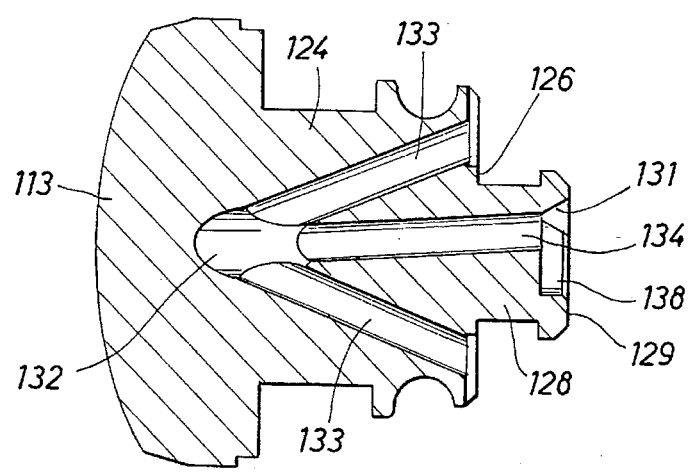
FIG. 8 is a cross-section of a journal bearing cantilevered from a leg of the rock bit illustrating the air passages formed therein.

FIG. 8 is an alternative design primarily suited to bits smaller in diameter than 7⅞ inches. The bit leg 113 forms passage 132 which in turn feed air to journal passages 133 to snoochie 126 and passage 134 to the end of spindle 128. The difference between this embodiment and the preferred embodiments of FIGS. 1 through 7 is that their is no channel across the end 129 of spindle 128. The exit 131 of passage 134 is offset from the axis and flared to direct cooling air around and through the bearing surfaces formed between opposite thrust plugs at the end of the spindle (not shown).

FIG. 9 is still another embodiment of the invention wherein the bit leg 213 forms air channel 233 which feeds air to a single air passage 233. Air passage 233 leads to the snoochie 226. An enlarged, substantially central, air passage 234 directs air into channel 236 formed in end 229 formed in spindle 228.

FIG. 10 differs from FIG. 7 in that the tungsten carbide disc or thrust button 40 is pressed into socket 238 formed in end 229 of spindle 228. The apposing, hardened steel thrust bearing 50 is pressed into socket 239 formed in cone 218. The exit 237 of passage 234 is offset from the axis of the journal and intersects the channel 236 at a point nearest the undulating edge 243 of disc 40. Hence air flow is directed more efficiently both under surface 242 of the disc 40 and across the mated thrust bearing surfaces 241 and 251 of the carbide disc and the hardened steel disc.

Air is directed through single air passage 233 to snoochie 226 into relieved channel 235 formed in the snoochie surface. The relieved shelf 235 on opposite sides of the snoochie assures that sufficient coolant is supplied to the radial bearing surfaces formed between the journal 224 and the rotating cone 218 secured thereto.

It would be obvious to utilize tungsten carbide for both of the apposing thrust buttons. For example, the tungsten carbide pressed into the retention socket formed in the spindle could be a different hardness (or the same hardness) and grade as the tungsten carbide utilized in the retention socket formed in the rotary cone without departing from the spirit of this invention (not shown).

It will of course be realized that various modifications can be made in the design and operation of the present invention without departing from the spirit thereof. Thus while the principal preferred construction and mode of operation of the invention have been explained in what is now considered to represent its best embodiments which have been illustrated and described, it should be understood that within the scope of the appended claims the invention may be practiced otherwise than as specifically illustrated and described.

What is claimed is:

1. A radially disposed thrust bearing apparatus for fluid cooled and lubricated rotary cone rock bits comprising, a first, non-rotating, radially aligned thrust bearing disc retained within a retention socket formed in the end of an axially aligned bearing cantilevered from a leg of the rock bit, a second apposing, non-rotating, radially aligned thrust bearing disc is positioned adjacent to the first thrust bearing disc and retained within a socket formed by a rotary cone retained on the bearing extending from the leg, at least one of the thrust bearing discs is formed from a relatively brittle carbide, the carbide disc having substantially large valley and peak undulations formed around a peripheral edge of the disc to form a robust peripheral edge for the carbide disc that substantially resists cracking when the carbide disc is placed within its disc retention socket.

2. The invention as set forth in claim 1 further comprising at least one fluid passage formed in the cantilevered bearing that directs fluid from an interior of the rock bit to the rock bit bearings, an exit end formed by the passage is positioned adjacent to the first thrust bearing disc retained in the end of the cantilevered bearing to cool and clean the first and second apposed thrust bearing discs during operation of the rock bit in a borehole.

3. The invention as set forth in claim 2 wherein the exit end of the passage intersects a channel groove formed in the end of the cantilevered bearing, the channel groove intersects the socket that retains the first radially disposed thrust bearing disc retained in the end of the of the cantilevered bearing and serves to cool the apposed thrust bearing discs during operation of the rock bit in a borehole.

4. The invention as set forth in claim 2 wherein the exit end of the fluid passage in the cantilevered bearing is offset from an axis of the cantilevered bearing and flared to widely disperse the fluid to the apposed thrust bearing discs.

5. The invention as set forth in claim 1 wherein a spindle bearing axially extends form the end of the cantilevered bearing, the spindle bearing is less in diameter than the diameter of the cantilevered bearing, the first non-rotating radially aligned bearing disc being retained within a socket formed in the end of the spindle bearing.

6. The invention as set forth in claim 1 wherein one of the thrust bearing discs is formed from hardened steel.

7. The invention as set forth in claim 1 wherein the other thrust bearing disc is formed from tungsten carbide.

8. The invention as set forth in claim 1 wherein the first, non-rotating, radially disposed thrust bearing disc is retained within a socket formed in the end of the cantilevered bearing and consists of hardened steel.

9. The invention as set forth in claim 1 wherein the second radially disposed thrust bearing disc retained within a socket formed in the cone is tungsten carbide.

10. The invention as set forth in claim 1 wherein the first and second radially aligned thrust bearing discs are interference fitted within their respective retention sockets.

11. The invention as set forth in claim 1 wherein the first and second thrust bearing discs are tungsten carbide.

12. The invention as set forth in claim 11 wherein one of the tungsten carbide discs is of a different grade and hardness than the apposing tungsten carbide disc.

13. The invention as set forth in claim 1 wherein the fluid is air.

14. A radially disposed thrust bearing assembly for air cooled and lubricated rotary cone mining type rock bit comprising, a first, non-rotating, radially aligned hardened steel thrust bearing disc interference fitted within a socket formed in the end of a spindle bearing extending from the end of an axially aligned bearing cantilevered from a leg of the rock bit, a second apposing, non-rotating, radially aligned tungsten carbide thrust bearing disc is positioned adjacent to the first hardened steel disc bearing and interference fitted with a retention socket formed by a rotary cone rotatively secured to the bearing cantilevered from the leg, the tungsten carbide thrust bearing disc forming substantially large valley and peak undulations around a peripheral edge of the carbide disc, the robust undulations formed by the disc resists cracking when the carbide disc is interfitted within its retention socket formed in the cone.

15. The invention as set forth in claim 14 further comprising at least one air passage formed in the cantilevered bearing that directs air from an interior of the rock bit to the rock bit bearings formed between the cantilevered bearing and the cone, and exit end of the passage is positioned adjacent to the hardened steel thrust bearing disc interference fitted in the end of the spindle bearing to cool clean and lubricate the first and second thrust bearing discs during operation of the rock bit in a borehole.

16. The invention as set forth in claim 15 wherein the exit end of the passage exits intersects a channel groove formed in the end of the spindle bearing, the channel groove exposes the bottom of the disc retention socket that retains the hardened steel disc, the channel serves to cool the first and second thrust bearing discs during operation of the bit in a borehole.

17. The invention as set forth in claim 16 wherein the exit end of the air passage is offset from an axis of the cantilevered bearing and intersects a peripheral edge of the hardened steel disc, the exit end of the air passage is further flared to widely disperse cooling air to the apposed first and second thrust bearing discs.

18. The invention as set forth in claim 14 wherein the second tungsten carbide disc is interference fitted within the retention socket formed in the end of the spindle bearing and the first hardened steel disc is interference fitted within the retention socket formed in the cone.

* * * * *